US00RE38503E

(19) United States
(12) Reissued Patent
Iida et al.

(10) Patent Number: US RE38,503 E
(45) Date of Reissued Patent: Apr. 20, 2004

(54) INFORMATION RECORDING DISK

(75) Inventors: Tamotsu Iida, Tsuchiura (JP); Shinichi Arai, Odawara (JP); Takeshi Maeda, Kokubunji (JP)

(73) Assignees: Hitachi Maxell, Ltd., Ibaraki (JP); Hitachi, Ltd., Tokyo (JP)

(21) Appl. No.: 09/945,635

(22) Filed: Sep. 5, 2001

Related U.S. Patent Documents

Reissue of:
(64) Patent No.: 5,255,261
Issued: Oct. 19, 1993
Appl. No.: 07/541,742
Filed: Jun. 21, 1990

(30) Foreign Application Priority Data

Jun. 27, 1989 (JP) ..... 1-162671

(51) Int. Cl.[7] ..... G11B 7/24
(52) U.S. Cl. ..... 369/275.3; 369/44.26
(58) Field of Search ..... 369/275.3, 275.2, 369/275.4, 44.26, 44.34, 53.2, 53.41

(56) References Cited

U.S. PATENT DOCUMENTS

| | | | | |
|---|---|---|---|---|
| 4,016,603 A | | 4/1977 | Ottesen | |
| 4,507,763 A | | 3/1985 | Kato | |
| 4,530,018 A | | 7/1985 | Hoshino | |
| 4,750,059 A | | 6/1988 | Syracuse | |
| 4,918,677 A | | 4/1990 | Ashinuma et al. | |
| 4,929,822 A | | 5/1990 | Nakamura et al. | |
| 5,255,261 A | | 10/1993 | Iida et al. | |
| 5,796,711 A | * | 8/1998 | Tomita et al. | 369/275.4 |
| 5,841,757 A | * | 11/1998 | Takeshima et al. | 369/275.3 |
| 5,850,381 A | * | 12/1998 | Miyano | 369/111 |

FOREIGN PATENT DOCUMENTS

| | | |
|---|---|---|
| DE | 3604916 | 8/1986 |
| FR | 2578346 | 9/1986 |
| JP | 62-80865 | 4/1987 |

* cited by examiner

*Primary Examiner*—Tan Dinh
(74) *Attorney, Agent, or Firm*—Birch, Stewart, Kolasch & Birch, LLP

(57) ABSTRACT

An information recording disk having a structure that a ring-shaped recording region is divided into a plurality of concentric, annular blocks, each of the blocks is divided in a circumferential direction into a plurality of equal sectors, and a recording track and a pit train for generating a header signal are previously formed in the recording region so that the recording density of a block increases as the block is nearer to the outer circumference of the recording region, *in comparison with constant angular velocity type,* is disclosed in which disk the recording region has a portion where blocks are pre-formatted so that the pit pitch of the header-signal generating pit train formed on the innermost recording track of the outer one of two adjacent blocks is greater than the pit pitch of the header-signal generating pit train formed on the innermost recording track of the inner block.

4 Claims, 4 Drawing Sheets

FIG. 4

| BLOCK NUMBER | DIAMETER (mm) | NUMBER OF SECTORS | SECTOR LENGTH (mm) | PIT PITCH (μm) | TRACK ADDRESS |
|---|---|---|---|---|---|
| 0 | 135.6 | 51 | 8.353 | 1.366 | 0 |
| 1 | 138.7 | 52 | 8.380 | 1.370 | 1024 |
| 2 | 141.7 | 53 | 8.405 | 1.374 | 2048 |
| 3 | 144.8 | 54 | 8.424 | 1.378 | 3072 |
| 4 | 147.9 | 55 | 8.448 | 1.381 | 4096 |
| | | | | | |
| | | | | | |
| 25 | 212.4 | 76 | 8.780 | 1.435 | 25600 |
| 26 | 215.5 | 77 | 8.792 | 1.437 | 26624 |
| 27 | 218.5 | 78 | 8.805 | 1.439 | 27648 |
| | | | | | |
| | | | | | |
| 43 | 267.7 | 94 | 8.947 | 1.463 | 44032 |
| 44 | 270.8 | 95 | 8.955 | 1.464 | 45056 |
| 45 | 273.8 | 96 | 8.963 | 1.465 | 46080 |
| 46 | 276.9 | 97 | 8.968 | 1.466 | 47104 |

INFORMATION RECORDING DISK

Matter enclosed in heavy brackets [ ] appears in the original patent but forms no part of this reissue specification; matter printed in italics indicates the additions made by reissue.

BACKGROUND OF THE INVENTION

The present invention relates to information recording disks such as an optical disk, and more particularly to an optical disk according to a novel method of dividing a recording region into parts and of forming a header-signal generating pre-pit train.

An optical disk of the modified constant angular velocity (MCAV) type has been proposed which is higher in recording density than an optical disk of the constant angular velocity (CAV) type.

In the optical disk of the MCAV type, a ring-shaped recording region is divided in radial directions into a plurality of concentric, annular blocks, each of the blocks being divided in a circumferential direction into a plurality of equal sectors so that the number of sectors included in the outermost block is about twice as large as the number of sectors included in the innermost block and sectors included in all the blocks have substantially the same length, and a pit train for generating a header signal is previously formed in each sector at a fixed pit pitch.

When this optical disk is rotated at a constant angular velocity, and an appropriate clock frequency is used for each block, a linear recording density can be made constant in the whole of the recording region extending from the inner circumference thereof to the outer circumference (refer to Japanese Patent Application JP-A-62-80,865).

SUMMARY OF THE INVENTION

A reproduced signal read out from an optical disk is separated into a data pulse and a clock pulse by a window-signal which is produced by a data separator, and then data is reconstructed.

The reproduced signal obtained from the optical disk includes jitter due to variations in rotational speed of a disk driving motor, variations in laser output power, variations in output of a variable frequency generator, variations in recording sensitivity on the optical disk, the deformation of the disk in a rotating state, and other reasons. In other words, a peak position in the reproduced signal is shifted before and behind a reference position in a writing operation. Accordingly, when the window width is not made large, the time margin of the peak shift for the window width, that is, a jitter margin is reduced, and thus a reproducing error is readily generated.

When the optical disk is rotated at a constant angular velocity, the jitter due to the above-mentioned factors is kept substantially constant at the inner and outer parts of the optical disk. In an optical disk of the MCAV type, however, a pit train for generating a header signal is previously formed at a constant pit pitch at the inner and outer parts of the disk, and thus the width of the window signal produced by the data separator is small at an outer block having a large linear velocity for the light spot. Hence, as the light spot is nearer to the outermost block, the jitter margin is reduced, and the reproducing error is easy to generate.

It is an object of the present invention to provide an information recording disk which can solve the above-mentioned problem of the prior, and is high in recording density and low in error rate.

In order to attain the above object, according to the present invention, there is provided an information recording disk having a structure that a ring-shaped recording region is divided into a plurality of concentric, annular blocks, each of the blocks is divided [is] *in* a circumferential [directions] *direction* into a plurality of equal sectors, and a recording track and pit train for generating a header signal are previously formed in the recording region so that the recording density of a block increases as the block is nearer to the outer circumference of the recording region, *in comparison with constant angular velocity type,* in which disk the recording region has a portion where blocks are pre-formatted so that the pit pitch of the header-signal generating pit train formed on the innermost recording track of the outer one of two adjacent blocks is larger than the pit pitch of the header-signal generating pit train formed on the innermost recording track of the inner block.

In a case where the characteristics of the variable frequency generator included in the data separator are kept constant, the width of the window signal produced by the data separator is increased as the pit pitch of the header-signal generating pit train is larger, and the time duration of the window signal is decreased as the linear velocity of recording track is larger.

According, when the pit pitch of the header-signal generating pit train is made large at outer blocks where a recording track has a large linear velocity, reduction in window width due to the large linear velocity of recording track is substantially cancelled by an increase in pit pitch of the header-signal generating pit train.

Although the window width is decreased by employing the large linear velocity, the decrease is minimized by intentionally increasing the pit pitch.

BRIEF DESCRIPTION OF THE DRAWINGS

FIG. 4 is a table showing an example of the format of a 12-in. optical disk.

DESCRIPTION OF THE PREFERRED EMBODIMENT

An embodiment of an optical disk according to the present invention will be explained below, by way of example.

Figure 1:
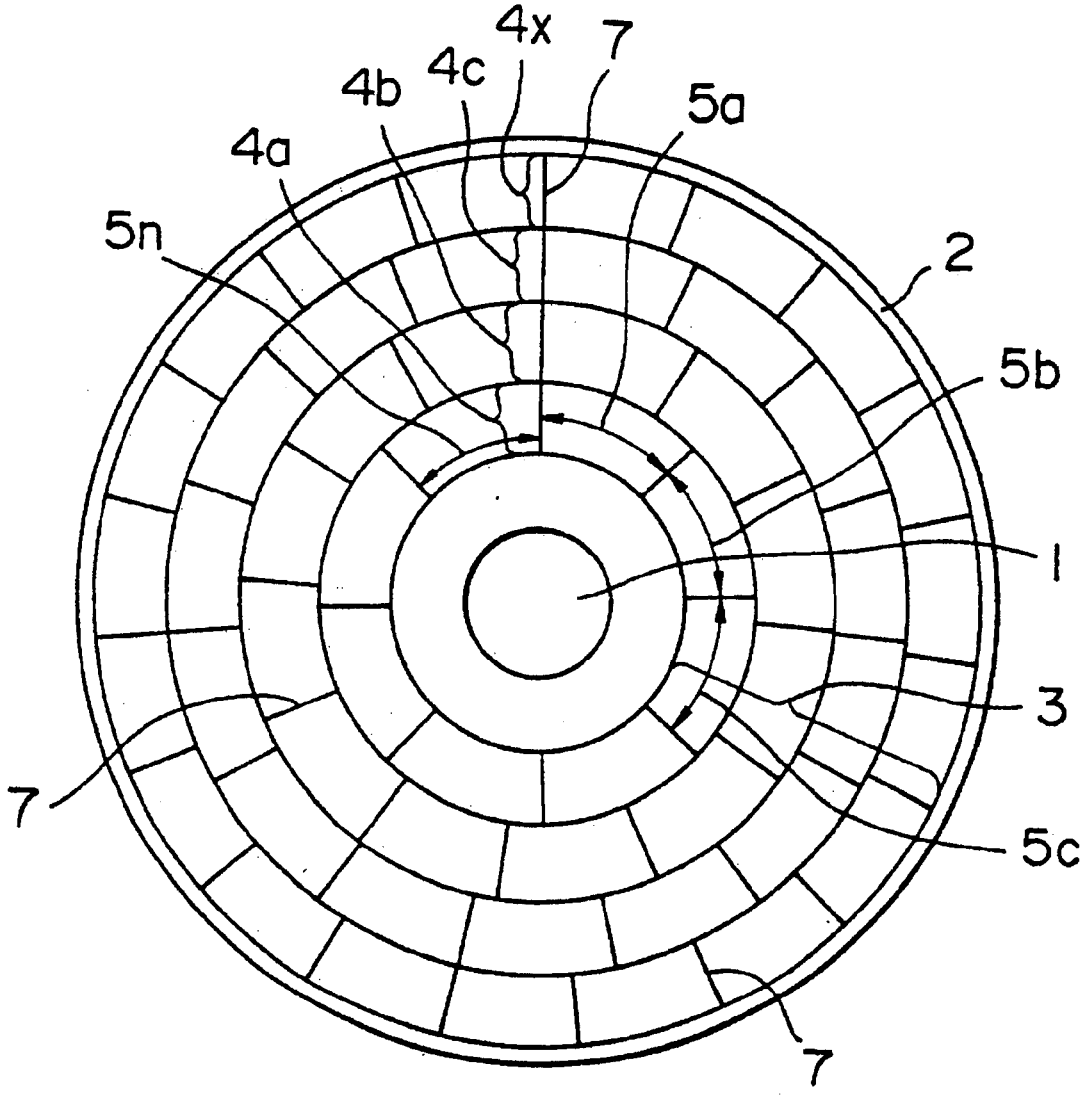
FIG. 1 is a plan view showing an embodiment of an information recording disk according to the present invention.

FIG. 1 is a plan view showing the embodiment of the invention. Referring to FIG. 1, a center hole 1 is provided in a substrate 2, and a ring-shaped recording region 3 is formed on a central portion sandwiched between the innermost and outermost portions of the substrate so that the recording region 3 is concentric with the center hole 1.

The recording region 3 is divided in radial directions into a plurality of concentric, annular blocks 4a, 4b, 4c, . . . and 4x, and each of the blocks 4a to 4x is divided in a circumferential direction into a plurality of sectors 5a, 5b, 5c and so on.

Figure 2:
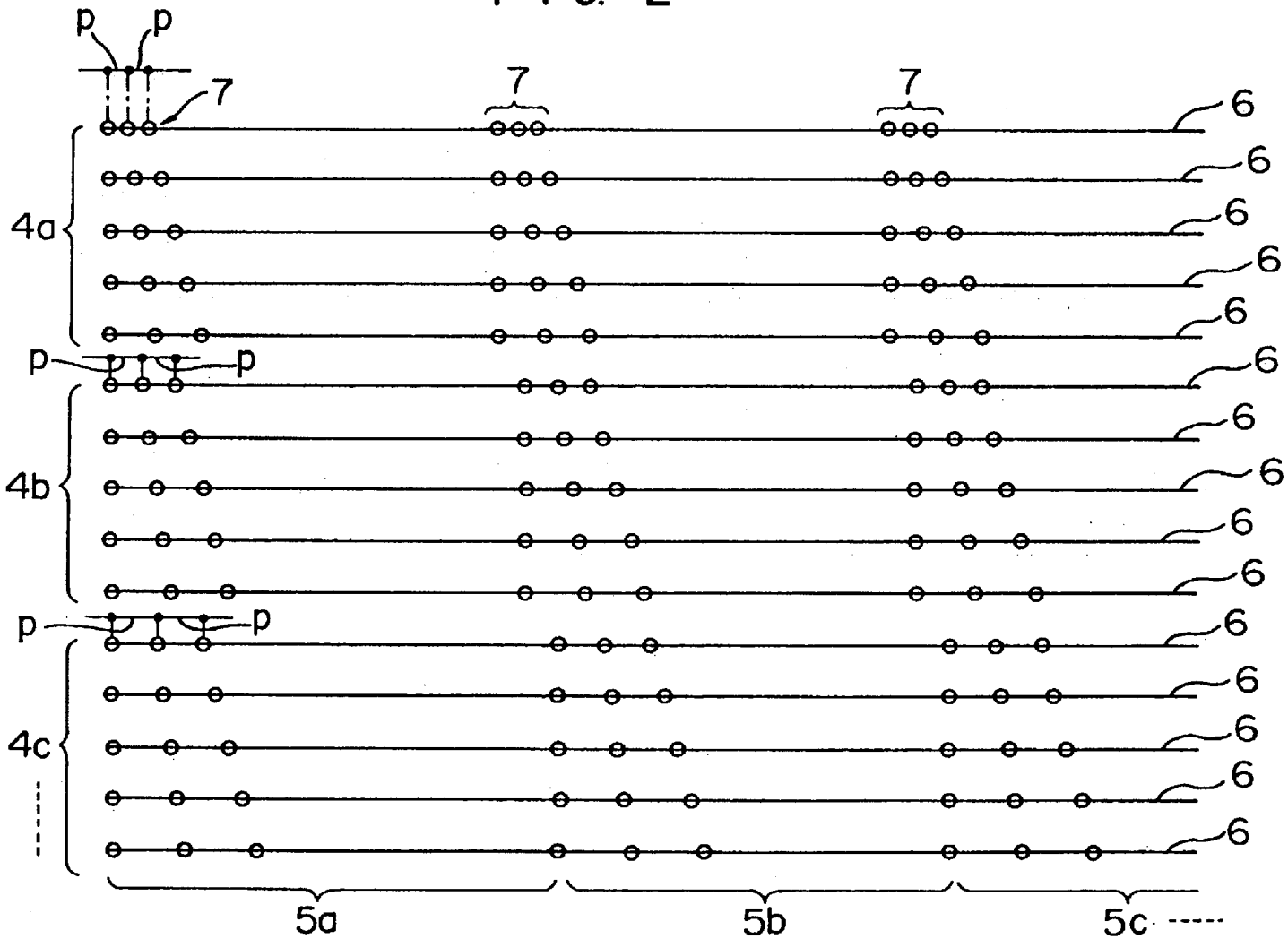
FIG. 2 is a schematic diagram for explaining the structure of each of blocks included in the embodiment of FIG. 1.

Further, as shown in FIG. 2, recording tracks 6 for guiding a light spot are concentrically or spirally formed at a constant track pitch in the whole of the recording region 3 extending from the innermost portion thereof to the outermost portion.

The track pitch is usually as small as about 1.6 μm. It is to be noted that the format shown in FIG. 1 can include the desired recording tracks (that is, spiral tracks or concentric tracks).

Further, the recording region 3 is divided into the blocks 4a to 4x so that each block includes the same number of recording tracks.

Figure 3:
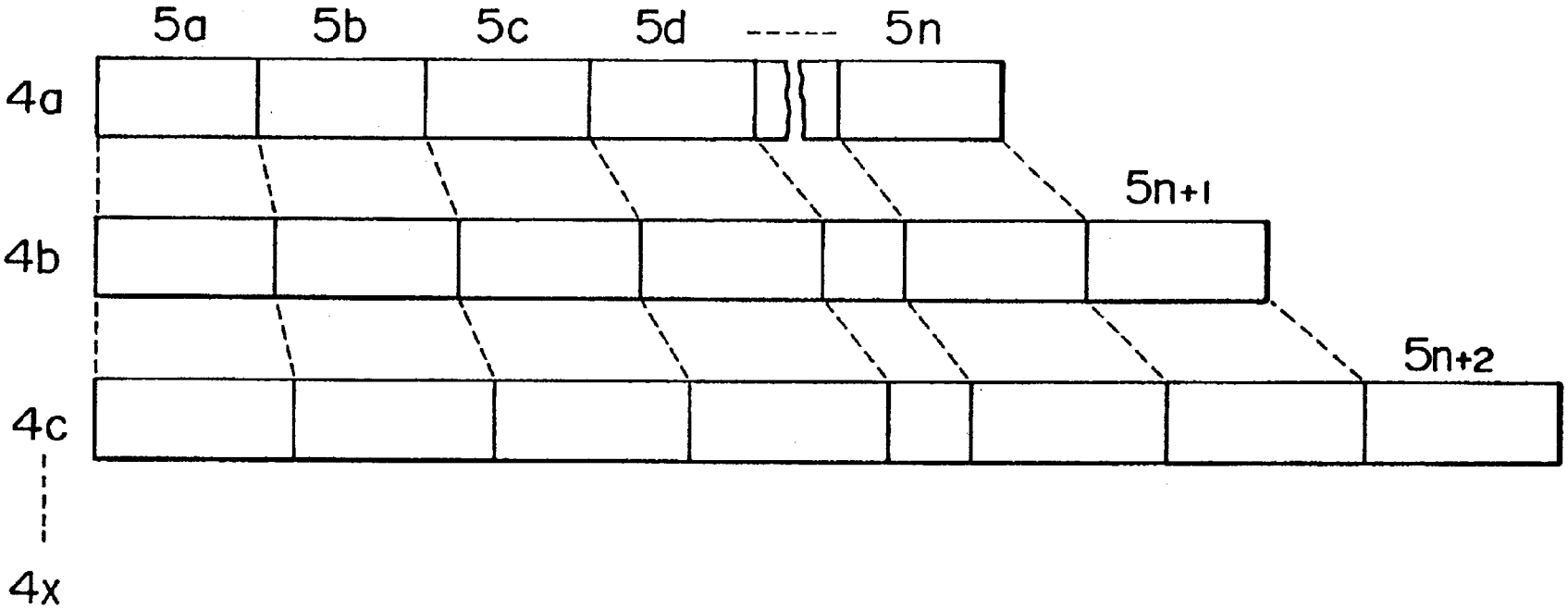
FIG. 3 is a schematic diagram for explaining the sector configuration in the embodiment of FIG. 1.

As shown in FIG. 3, each of the blocks 4a to 4x is divided into a plurality of equal sectors 5a, 5b, 5c, and so on so that the number of sectors included in the outer one of adjacent blocks is one or two greater than the number of sectors included in the inner block, and the sector length in the outer block is greater than the sector length in the inner block. Now, let us consider an inventive optical disk shown in FIG. 4. For example, the sector length in a block which is indicated by a block number of 25 and has a radius of 212.4 mm, is 8.78 mm, and the sector length in a block which is indicated by a block number of 26 and has a radius of 215.5 mm, is 8.792 mm. In other adjacent blocks, also, the sector length in the outer block is greater than the sector length in the inner block. It is to be noted that the sector length indicates the length of the innermost one of recording tracks included in a fan-shaped sector.

Further, as shown in FIG. 2, in a head portion of that part of a recording track 6 which is induced in one of the sectors 5a, 5b, 5c, and so on, there is formed a pre-pit train 7 for indicating the address of the sector and others and for generating, for example, a header signal. When the present embodiment is viewed in a direction parallel to the main surface thereof, the pre-pit train 7 is observed, as shown in FIG. 1, in the form of a straight line produced along the boundary between adjacent ones of the sectors 5a, 5b, 5c, . . . and The pit pitch p of the pre-pit train 7, as shown in FIG. 2, is made proportional to the sector length. Accordingly, in the whole recording region of the present embodiment extending from the innermost block 4a to the outermost block 4x, the pit pitch of the prepit train 7 formed in the outer one of adjacent blocks is larger than the pit pitch of the pre-pit train 7 formed in the inner block.

As mentioned above, in the present embodiment, the pit pitch p used in a block increases, as the block is nearer to the outer circumference of the recording region. Accordingly, a reduction in window width due to the large linear velocity of a recording track can be substantially cancelled by an increase in pit pitch of the pre-pit train. Thus, a sufficiently large jitter margin can be obtained all over the recording region extending from the inner circumference thereof to the outer circumference, and an error rate can be reduced.

Further, in the present embodiment, the number of sectors included in a block increases, as the block is nearer to the outer circumference of the recording region. Accordingly, the recording density of outer blocks is high *in comparison with constant angular velocity type*. Thus, a high-density optical disk can be obtained which is equal in recording capacity to a conventional optical disk of the MCAV type.

FIG. 4 shows an example of the format of an optical disk according to the present invention. This optical disk has a diameter of 12 inches, and the recording region of the optical disk is divided into 47 blocks which have the same width in radial directions and are indicated by block numbers of 0 to 46. Recording tracks are formed at a track pitch of 1.5 μm in the whole of the recording region extending from the inner circumference thereof to the outer circumference. Thus, 1024 recording tracks are arranged in each block.

The innermost block having a block number of 0 is divided into 51 equal sectors, and the number of sectors included in a block is incremented by one each time a block number is increased by one. Thus, as shown in FIG. 4, the sector length in the outer one of two-adjacent blocks selected from 47 blocks is always greater than the sector length in the inner block. Incidentally, the term "diameter" in FIG. 4 indicates the diameter of the innermost recording track of each block, and the term "sector length" in FIG. 4 indicates a value which is obtained by dividing the length of the innermost recording track of each block by the number of sectors included in the block.

A pre-pit train for generating a header signal is formed in a head portion of each sector, and the pit pitch of the pre-pit train is set so that each of sectors included in the recording region has a recording capacity of 1.146 bytes. Accordingly, the pit pitch is proportional to the sector length, and is increased from a minimum value in the innermost block to a maximum value in the outermost block. In more detail, the pit pitch in the innermost block is 1.366 μm, and the pit pitch in the outermost block is 1.466 μm. It is known from a ratio of the pit pitch in the outermost block to the pit pitch in the innermost block that the window width in the outermost block becomes greater than the window width in the innermost block by a factor of about 1.073.

The gist of the present invention resides in that the recording region of an information recording disk includes a portion where each block is divided into sectors and a header-signal generating pit train is formed in each sector so that the pit pitch of the pit train formed in the outer one of adjacent blocks is larger than the pit pitch of the pit train formed in the inner block. Accordingly, the recording region of an information recording disk according to the present invention may be divided into sectors in a manner different from the above embodiment, or may have a format different from the above-mentioned.

In the above embodiment, a pre-pit train is formed in all the blocks existing between the inner circumference and outer circumference of the recording region so that the pit pitch of the pre-pit train formed in the outer one of adjacent blocks is larger than the pit pitch of the pre-pit train formed in the inner block. Alternatively, the above format may be applied only to blocks which exist on the outside of a central portion of the recording region in radial directions and readily generate a reproducing error.

Generally speaking, in a case where a reproducing operation is performed for an optical disk of the MCAV type, it is necessary to use different data clocks for individual blocks. In a case where blocks included in that special portion of the recording region where the reproducing error is easy to generate, are made different in the number of sectors included in one block from each other in accordance with the present invention, it is necessary to change the data clock in the special portion of the recording region, as in a case where a reproducing operation is performed for a conventional optical disk of the MCAV type. Through the data clock is needed to be differentiated, it is substantially as same as in MCAV since employing of different data clocks is utilized in MCAV.

In the above embodiment, the recording region is divided into sectors so that the number of sectors included in the outer one of adjacent blocks is greater than the number of sectors included in the inner block by one. Alternatively, the recording region may be divided into sectors so that the number of sectors included in the outer one of adjacent blocks is greater than the number of sectors included in the inner block by two or more.

Further, in the above embodiment, each block is divided into sectors and a pre-pit for generating a header signal is formed in each sector so that all the sectors included in the recording region have the same recording capacity. In this case, the number of sectors included in an outer block is greater than the number of sectors included in an inner block, and thus the recording capacity of the outer block is greater than that of the inner block. In a case where the optical disk is formatted so that all the blocks included in the recording region have the same recording capacity, the number of recording tracks included in an outer block is made smaller than the number or recording tracks included in an inner block.

In the above embodiment, the recording region is divided into blocks so that all the blocks include the same number of recording tracks. Alternatively, the number of recording tracks included in a block may be different from the number of recording tracks included in another block.

Although the format of a 12-in. optical disk has been explained, by way of example, the present invention is applicable to an optical disk having a desired diameter.

Although an inventive optical disk having a pre-pit train has been explained in the foregoing, the present invention is also applicable to an optical disk having an add-on pit train.

As has been explained in the foregoing, according to the present invention, a reduction in window width due to a large linear velocity of recording track is substantially cancelled by an increase in pit pitch of a pit train for generating a header signal, and thus a sufficiently larger jitter margin is obtained all over the recording region extending from the inner circumference thereof to the outer circumference.

Further, according to the present invention, the recording density of a block increases as the block is nearer to the outer circumference of the recording region, *in comparison with constant angular velocity type,* and hence a high-density optical disk can be obtained which is substantially equal in recording capacity to a conventional optical disk of the MCAV type.

Thus, according to the present invention, there is provided an information recording disk which is low in error rate and large in recording capacity.

The invention being thus described, it will be obvious that the same may be varied in many ways. Such variations are not to be regarded as a departure from the spirit and scope of invention, and all such modifications as would be obvious to one skilled in the art are intended to be included within the scope of the following claims.

We claim:

1. An information recording disk comprising an annular structure, having an inner circumferential periphery and an outer circumferential periphery, and a concentric ring-shaped recording region provided thereon between the inner circumferential periphery and the outer circumferential periphery and the recording region including a plurality of concentric, annular blocks extending from an innermost annular block adjacent to the inner circumferential periphery to an outermost annular block adjacent to the outer circumferential periphery, each of the plurality of annular blocks being divided in a circumferential direction into a plurality of sectors, each of the plurality of sectors in any one of the plurality of annular blocks being of equal sector length, the number of sectors in an outer one of two adjacent annual blocks being larger than the number of sectors in an inner one of two adjacent annular blocks, and having a plurality of recording tracks and a plurality of pit trains for generating a header signal preformed in each of said annular blocks, at least one of said plurality of pit trains being associated with each of said plurality of sectors such that the recording density of an annular block increases from said innermost annular block to said outermost block, *in comparison with constant angular velocity type,* the sector length of each of the sectors in the outer one of two adjacent annular blocks is greater than the sector length of each of the sectors in the inner annular block, and the header-signal generating pit train is preformed therein in each of the plurality of sectors so that all the sectors in adjacent annular blocks have the same recording capacity, wherein the recording region has a recording portion in which at least two of the plurality of annular blocks are pre-formatted so that a pit pitch of the header-signal generating pit train formed on an innermost recording track of the outer one of two adjacent annular blocks is larger than the pit pitch of the header-signal generating pit train formed on the innermost recording track of the inner annular block and sector length is defined as the length of the innermost recording track in any one of the plurality of annular blocks divided by the number of sectors in such annular block.

2. The information recording disk according to claim 1 wherein each of the plurality of annular blocks has the same number of recording tracks.

3. An information recording disk comprising an annular structure, having an inner circumferential periphery and an outer circumferential periphery, and a concentric ring-shaped recording region provided thereon between the inner circumferential periphery and the outer circumferential periphery, and the recording region including a plurality of concentric, annular blocks extending from an innermost annular block adjacent to the inner circumferential periphery to an outermost annular block adjacent to the outer circumferential periphery, each of the plurality of annular blocks being divided in a circumferential direction into a plurality of sectors, each of the plurality of sectors in any one of the plurality of annular blocks being of equal sector length, sector length being defined as the length of the innermost recording track in any one of the plurality of annular blocks divided by the number of sectors in such annular block, the number of the sectors in an outer one of two adjacent annular blocks being larger than the number of sectors in an inner one of two adjacent annular blocks, and having a plurality of recording tracks and a plurality of pit trains for generating a header-signal preformed therein, and further having the plurality of add-on pit trains, an add-on pit train being defined as a pit train recorded by a user, one of said plurality of header-signal generating pit trains and one of said plurality of add-on pit trains being associated with each of said plurality of sectors, wherein the header-signal generating pit train and the add-on pit train formed from an innermost recording tract radially outwardly to an outermost recording tract of the outer one of said two adjacent annular blocks increase in pit pitch greater than the header-signal generating pit train and the add-on pit train formed from an innermost recording track of the inner one of said two adjacent annular blocks, to obtain a larger jitter margin in the header signal generating pit train and the add-on pit train of the outer one of said two adjacent annular blocks than in the header-signal generating pit train and the add-on pit train of said the inner one of said two adjacent annular blocks.

4. An information recording disk comprising an annular structure, having an inner circumferential periphery and an outer circumferential periphery, and a concentric ring-shaped recording region provided thereon between the inner circumferential periphery and the outer circumferential periphery, and the recording region including a plurality of concentric, annular blocks extending from an innermost annular block adjacent to the inner circumferential periphery to an outer most annular block adjacent to the outer circumferential periphery, each of the plurality of annular blocks being divided in a circumferential direction into a plurality of sectors, each of the plurality of sectors in any one of the plurality of annular blocks being of equal sector length, sector length being defined as the length of the innermost recording track in any one of the plurality of annular blocks divided by the number of sectors in such annular block, the number of sectors in an outer one of two adjacent annular blocks being larger than the number of sectors in an inner one of two adjacent annular blocks, and having a plurality of recording tracks and a plurality of trains for generating a header-signal preformed therein, and further having a plurality of add-on pit trains, an add-on pit train being defined as a pit train recorded by a user, one of said plurality of header-signal generating pit trains, and one of said plurality of add-on pit trains being associated with each of said plurality of sectors, wherein:

said header-signal generating pit train and said add-on pit trains are formed on or alongside said tracks disposed in the direction from an innermost track to an outermost track of each of said annular blocks and extending circumferentially having pit pitch gradually increased from said innermost track to said outermost track in each of said annular blocks, and each of said pit pitch of said header-signal generating pit trains and add-on pit trains of each of the tracks disposed in an outer one of two adjacent annular blocks is wider than the corresponding pit pitch of the header-signal generating pit trains and add-on pit trains formed on or alongside the tracks disposed in the direction from an innermost track to an outermost track and extending circumferentially formed in an inner annular block than that in said outer annular block, in a degree to increase jitter margin in the header-signal generating pit trains and add-on pit trains in outer annular blocks compared to the header-signal generating pit trains and add-on pit trains in inner annular blocks.

* * * * *